United States Patent [19]

Busson

[11] Patent Number: 5,252,906
[45] Date of Patent: Oct. 12, 1993

[54] METHOD OF OPTIMIZING THE CHARGING OF A BATTERY OF STORAGE CELLS, AND APPARATUS FOR PERFORMING THE METHOD

[75] Inventor: Guy Busson, Athee Sur Cher, France

[73] Assignee: SAFT, Romainville, France

[21] Appl. No.: 832,586

[22] Filed: Feb. 7, 1992

[30] Foreign Application Priority Data

Feb. 8, 1991 [FR] France ................ 91 01468

[51] Int. Cl.⁵ .................................... H02J 7/00
[52] U.S. Cl. ............................ 320/22; 320/35
[58] Field of Search .............. 320/22, 31, 35, 36

[56] References Cited

U.S. PATENT DOCUMENTS

| | | | |
|---|---|---|---|
| 3,603,862 | 9/1971 | Chase | 320/39 |
| 3,895,283 | 7/1975 | Peterson | 320/35 |
| 4,061,956 | 12/1977 | Brown et al. | 320/22 |
| 4,125,802 | 11/1978 | Godard | 320/35 |
| 4,237,411 | 12/1980 | Köthe et al. | 320/22 |
| 4,308,492 | 12/1981 | Mori et al. | 320/35 |
| 4,370,606 | 1/1983 | Kakumoto et al. | 320/35 |
| 4,433,277 | 2/1984 | Carollo et al. | 320/24 |
| 4,667,143 | 5/1987 | Cooper | 320/22 |
| 4,670,703 | 6/1987 | Williams | 320/22 |
| 4,737,702 | 4/1988 | Koenck | 320/36 |
| 5,079,716 | 1/1992 | Lenhardt et al. | 320/35 |
| 5,103,156 | 4/1992 | Jones et al. | 320/35 |

FOREIGN PATENT DOCUMENTS 2326052 4/1977 France .

Primary Examiner—Steven L. Stephan
Assistant Examiner—Thomas M. Dougherty
Attorney, Agent, or Firm—Sughrue, Mion, Zinn, Macpeak & Seas

[57] ABSTRACT

The invention relates to a method enabling a battery of storage cells to be charged in a charging mode for compensating for discharging to an external circuit, or in a maintenance mode for compensating for self-discharging of the battery. The method consists in:

determining (23) the charging capacity of the battery, as a function of the temperature (Tb) of the battery, the charging capacity decreasing and becoming less than the reference capacity when the temperature increases during a charging period;

calculating (25) the electricity balance between the quantity of electricity received by the battery and the quantity of electricity supplied by the battery to an external circuit; and deciding (31) to switch from maintenance mode to charging mode each time that the electricity balance is less than the charging capacity.

In this way, a battery may be charged to its optimum value, in a plurality of charging periods separated by maintenance mode periods, if the conditions of the battery, in particular its temperature, improve its charging capacity. The method is self-adapting to the charging characteristics of the battery without causing systematic overcharging at the end of each charging cycle. Application to power supplies backed up by batteries of storage cells.

11 Claims, 2 Drawing Sheets

METHOD OF OPTIMIZING THE CHARGING OF A BATTERY OF STORAGE CELLS, AND APPARATUS FOR PERFORMING THE METHOD

BACKGROUND OF THE INVENTION

The invention relates to a method of optimizing the charging of a battery of storage cells, and to apparatus for performing the method. Batteries of storage cells are used to supply numerous items of equipment with electrical energy when the public electricity mains fails. For example: automated equipment, data-processing hardware, telecommunications exchanges, etc. are backed up for a limited duration, by means of batteries of storage cells.

"Charging" consists in storing electrical energy in the battery in electrochemical form. The length of time during which the battery fulfills its backup function is limited in particular by the quantity of energy stored in the battery in electrochemical form, with "discharging" the battery consisting in giving back, in the form of electrical energy, the energy stored in electrochemical form. Optimizing the charging of a battery therefore consists in storing as much electrical energy as possible in electrochemical form. Furthermore, it is unnecessary and detrimental to supply a battery with electrical energy which cannot be converted into stored electrochemical energy. When a battery has stored the maximum possible energy in electrochemical form, "overcharging" phenomena appear, consisting in particular in electrolysis and a rise in temperature, or even thermal runaway.

Outside the charging periods, or the periods of discharging to an external circuit, a battery undergoes internal self-discharging which slowly dissipates the stored energy. In order to maintain its charged state, the battery is subjected to a "maintenance" mode making up for self-discharging by supplying the battery with a predetermined low current.

In conventional charging methods, the change-over from maintenance mode to charging mode takes place once only after each discharging period, and the change-over is selected as a function of certain parameters considered separately or in combination: the quantity of electricity supplied during the discharging period, or the duration of the discharging period. The change-over from charging mode to maintenance mode is also selected once only, as a function of certain parameters considered separately or in combination: the quantity of electricity supplied to the battery during the charging period; the charging current; the back-electromotive force of the battery; the temperature of the battery; the temperature difference of the battery above ambient temperature; and the duration of charging.

Conventional charging methods consist in going from charging mode to maintenance mode when overcharging actually takes place and can then be detected by means of the temperature of the battery or by means of the difference between the temperature of the battery and ambient temperature.

Other conventional charging methods consist in assuming that the charging capacity, i.e. the maximum amount of energy which can be stored in electrochemical form, is always equal to the reference capacity of the battery, which reference capacity is by definition the quantity of electrical energy that can be given back by the battery in the event that the battery has been optimally charged. The decision to switch from charging mode to maintenance mode is then taken either when the duration of charging at constant current reaches a fixed value; or when the electricity balance, i.e. the net quantity of electricity supplied by the battery to an external circuit, reaches a fixed value. In certain cases, the maximum storable energy is much less than the reference capacity because of a rise in ambient temperature, or because of battery ageing. After this maximum has been reached, the battery is subjected to overcharging.

These methods therefore suffer from the drawback of supplying energy unnecessarily to the battery during a certain length of time, at least in certain cases, and the energy may be detrimental to the length of life of the battery. All known charging methods further suffer from the drawback of not providing optimum charging in certain cases, because the charging capacity of the battery may vary as a function of various parameters, in particular temperature, whereas the discharging capacity remains equal to the reference capacity, because it depends almost entirely on the quantity of energy actually stored in electrochemical form, for the usual fields of use and for determined discharging conditions, in particular the discharging current.

The variation in the charging capacity as a function of the temperature of the battery depends on the manufacturing technology of the battery. Generally, charging capacity decreases when temperature increases. Consequently, a battery charged using a conventional method may reach its overcharging limit if charging conditions are unfavorable, i.e. if ambient temperature is high, whereas more favorable charging conditions may subsequently occur, in particular if the ambient temperature decreases. The capacity actually charged remains the capacity obtained during charging under unfavorable conditions. The capacity actually charged is therefore less than the capacity that the battery could obtain under new conditions that are more favorable.

SUMMARY OF THE INVENTION

An object of the invention is to provide a method of optimizing the charging of a battery of storage cells so as to store, in electrochemical form, an optimum quantity of energy, i.e. corresponding to the most favorable charging conditions encountered by the battery during the maintenance periods or charging since the most recent period of discharging, even if it was a period of partial discharging.

The method also aims to avoid systematic overcharging at the end of charging, in particular by automatically adapting the quantity of electricity to characteristics specific to the battery to be charged (capacity dispersions, in particular manufacturing dispersions).

The invention provides a method of optimizing the charging of a battery of storage cells, the method including a charging mode for compensating for discharging to an external circuit, and a maintenance mode for compensating for self-discharging of the battery, said method consisting in:

comparing the balance of electric charge, or charge balance, remaining on the battery (hereafter referred to as "the electricity balance") with a threshold quantity of electricity stored by the battery and the quantity of electricity supplied by the battery to an external circuit; and deciding either to switch from maintenance mode to charging mode, or to switch from charging mode to maintenance mode, as a function of the result of said comparison;

said method being characterized in that it consists in taking as the threshold value a calculated value of the quantity of electricity that the battery can store without manifesting overcharging phenomena, the value being referred to as the "charging capacity of the battery" and being calculated as a function of:

a "reference" capacity which is the charging capacity at a reference temperature;

the difference between the temperature of the battery at the moment in question and the reference temperature; and a predetermined relationship for variation in charging capacity as a function of temperature for the battery.

The method characterized in this way enables overcharging of the battery to be avoided since charging mode is stopped when the electricity balance is equal to the charging capacity of the battery under the actual conditions in which the battery finds itself, i.e. taking account of variations in the charging capacity.

A certain length a time after charging mode is stopped, if ambient temperature drops, the charging capacity has increased. By comparing the electricity balance with a new value for its charging capacity, the battery can be put back into charging mode, so as to increase the quantity of energy actually stored in electrochemical form. There is no overcharging phenomenon, since maintenance mode will be reselected as soon as the electricity balance has reached the new value of the charging capacity. Energy may therefore be stored during a plurality of charging periods, i.e. as many as are necessary for obtaining maximum storage.

BRIEF DESCRIPTION OF THE DRAWINGS

The invention will be better understood and other characteristics will appear on reading the following description given with reference to the accompanying drawings, in which.

DESCRIPTION OF THE PREFERRED EMBODIMENTS

Figure 1:
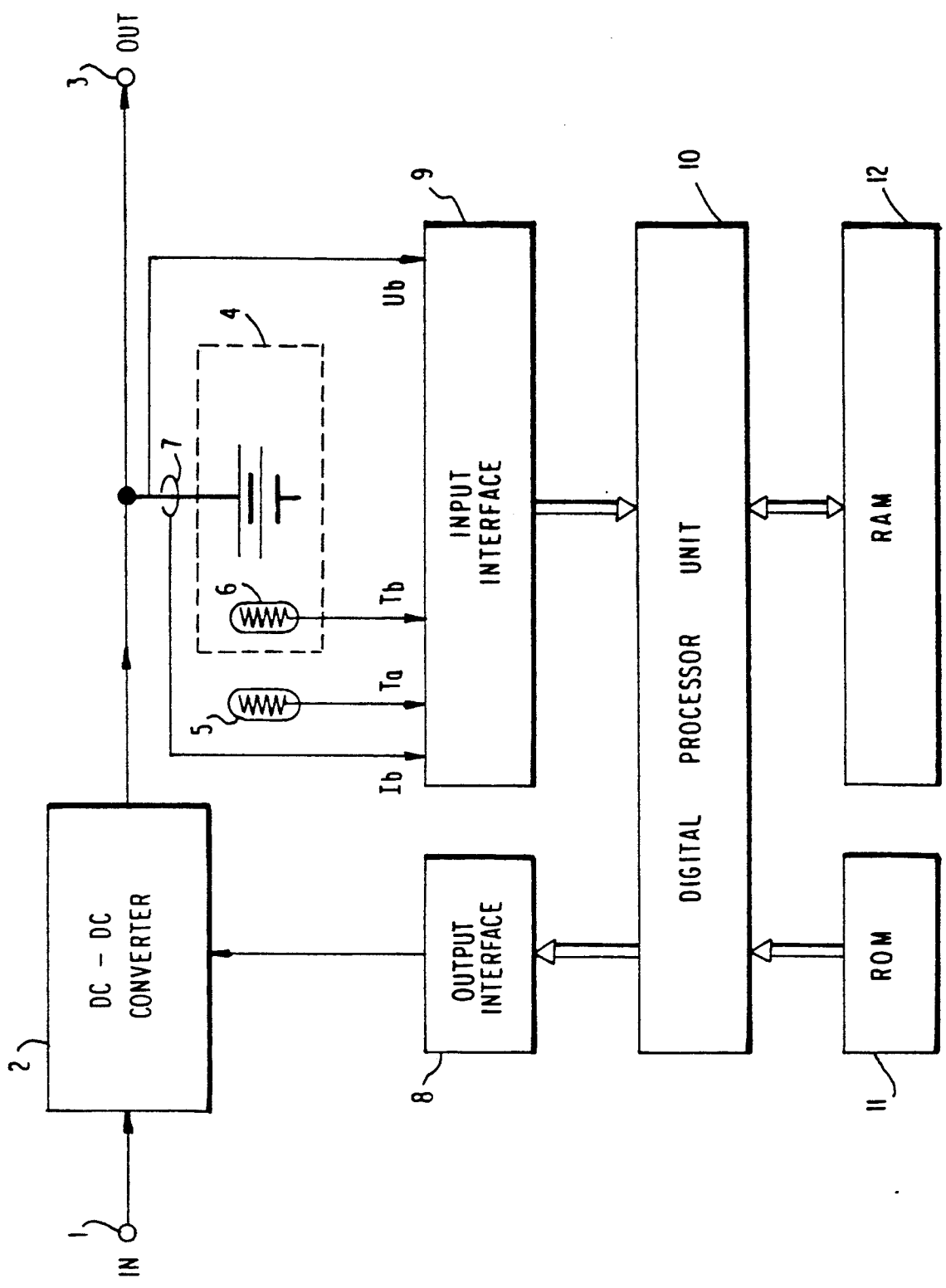
FIG. 1 is a block diagram of an embodiment of apparatus for/performing the method of the invention.

The embodiment shown in FIG. 1 includes:
an input terminal 1 which is connected to a conventional power supply, e.g. a transformer powered by the public electricity mains, and a rectifier and filter circuit (not shown);
a DC-to-DC converter 2;
an output terminal 3 connected to a user circuit (not shown);
a battery of storage cells 4, e.g. of the sealed nickel-cadmium type;
an ambient temperature sensor 5;
a temperature sensor 6 situated inside the battery 4;
a current sensor 7;
an output interface 8;
an input interface 9;
a digital processor unit 10;
a program memory 11; and
a backup memory 12.

When the electricity mains is operating normally, the function of the converter 2 is to power the user circuit, and to supply the battery 4 with: either a charging current to make up for discharging to the external circuit, or a maintenance current which is much lower to make up for self-discharging of the battery.

The converter 2 has: an input connected to the input terminal 1 for receiving a DC voltage when the electricity mains is operating normally; a control input connected to an output of the output interface 8; and an output connected to a first terminal of the battery 4 and to the output terminal 3. The second terminal of the battery 4 is not shown and is connected to a reference potential. The first terminal of the battery is connected to an input of the input interface 9 so as to enable it to measure the voltage Ub of the battery. The current sensor 7 is interposed on the first terminal and is connected to the input interface 9 so as to enable it to measure the current Ib flowing into or out of the battery 4.

The ambient temperature sensor 5 is connected to an input of the input interface 9 so as to enable it to measure the ambient temperature Ta. A temperature sensor 6 is placed in contact with the battery 4 and is connected to an input of the input interface 9 so as to enable it to measure the temperature Tb of the battery 4. The input interface 9 is connected to the digital processor unit 10 via a bus. It is a conventional interface performing, in particular, the function of analog-to-digital conversion.

The digital processor unit 10 is connected via buses to: the program memory 11 which is a read-only memory storing the sequence of instructions for performing the method of the invention; and to the backup memory 12 which is a read/write memory enabling data to be stored while the method of the invention is being performed. The digital processor unit 10 is connected via a bus to the output interface 8 whose main function is to control the converter 2 by supplying it either with a "switch to charge" signal, or with a "switch to maintain" signal. The output interface 8 in particular provides the power amplification and isolation necessary for controlling the converter 2 by means of the signals. The digital processor unit 10 supplies the signals in the form of a binary word which is not suitable for controlling the converter 2 directly.

If the public mains fails, the converter 2 can no longer perform its function. The control signal supplied by the output interface 8 no longer has any effect. The battery 4 then starts discharging into the user circuit and goes spontaneously into a discharging mode.

In compliance with the program stored in the program memory 11, the digital processor unit 10 processes the data received by the input interface 9, and controls the converter 2 by means of the signal supplied by the output of the output interface 8. The digital processor unit may be constituted by any conventional microprocessor.

Figure 2:
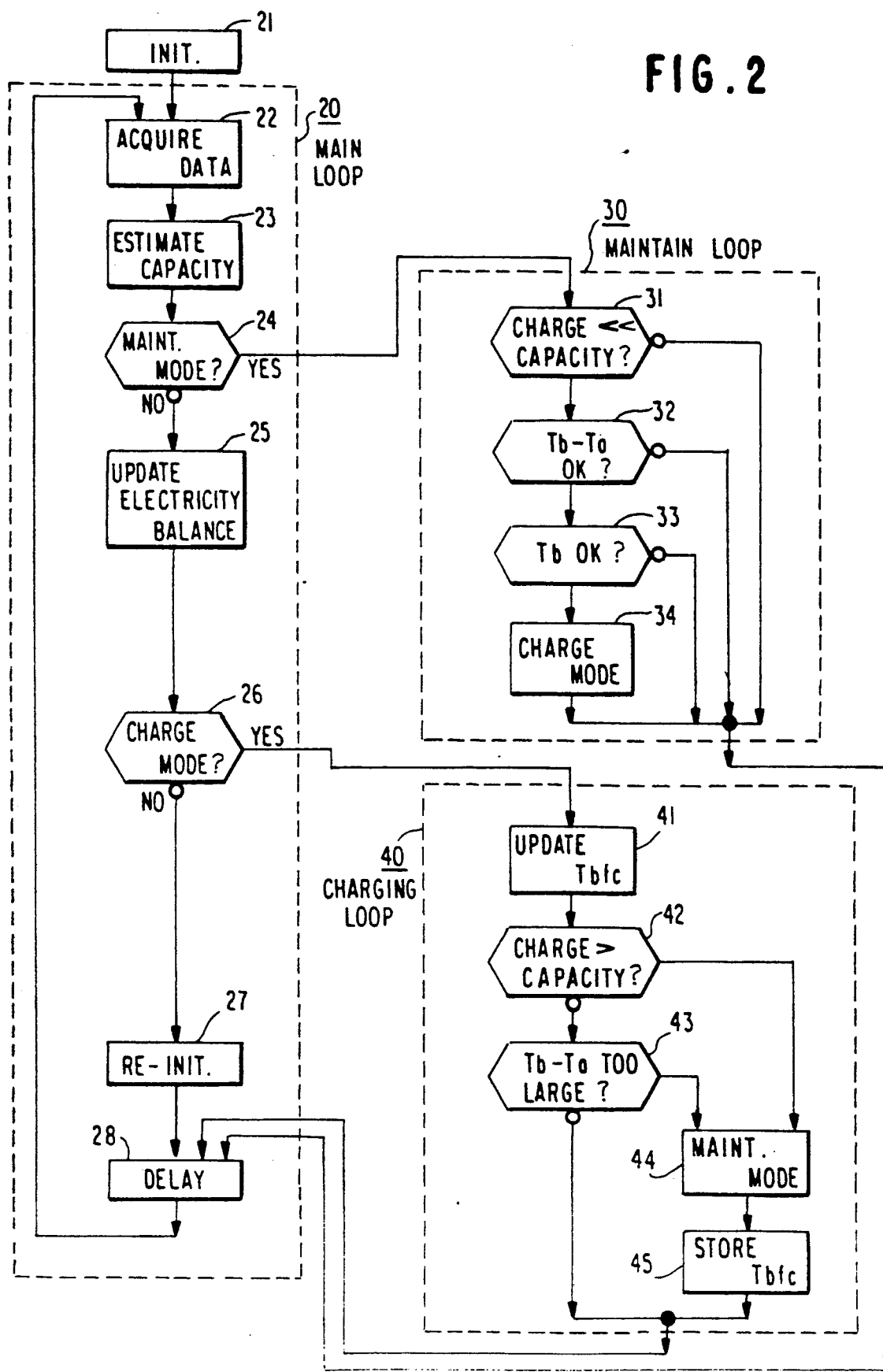
FIG. 2 is a flow chart of an implementation of the method of the invention.

FIG. 2 is the flow chart of the program run by the unit 10 in this embodiment. In practice, the same digital processor unit 10 performs additional functions, in particular monitoring functions for ensuring the safety of the battery and of the apparatus as a whole powering the user circuit. For this reason, the digital processor unit 10 receives the value Ub of the voltage of the battery. However, since the additional functions are conventional, they are not described herein.

The flow chart of this embodiment includes a main loop 20 essentially for updating the electricity balance between the quantities of electricity received and supplied by the battery 4, and enabling the rate at which the program runs to be set. The main function of a first subsidiary loop 30 is to decide whether or not to change modes so as to switch from maintenance mode to charging mode. The essential function of a second subsidiary loop 40 is to decide whether or not to change modes so as to switch from charging mode to maintenance mode.

Before entering the main loop 20, the program starts by an initialization step 21 performed when the apparatus for optimizing charging is switched on. The initialization step 21 consists in programming the interfaces 8 and 9, and in giving predetermined values to certain parameters: the balance of the quantities of electricity received and supplied by the battery is reset; and a parameter referred to as the "limit temperature" is set to a predetermined value referred to as the "maximum allowable temperature" which is the temperature that the battery must under no circumstances exceed at the start of charging.

The main loop 20 starts at 22 by acquiring the current Ib, the ambient temperature Ta, and the battery temperature Tb. It then consists at 23 in estimating the charging capacity as a function of the reference capacity at a reference temperature, and as a function of the difference between the temperature Tb of the battery, at the moment in question, and the reference temperature. A priori, for any given technology, the reference capacity of a battery is not accurately known. It depends on manufacturing dispersion and on the number of charge-discharge cycles. In practice, it is therefore necessary for the user of a given battery to measure its reference capacity in order to obtain an accurate value therefor.

Such measuring is performed in particular at the time of installation of the battery and in accordance with one of the following two methods:

starting from the discharged state: charge the battery until overcharging is detected, while measuring the quantity of electricity supplied, then multiply this quantity by a weighting coefficient so as to take into account the efficiency of the battery in transforming the energy received into stored electrochemical energy; or starting from the optimum charged state as obtained by prolonged charging until overcharging occurs: discharge the battery completely using a slow discharging rate until its voltage reaches a value characteristic of the completely discharged state, while measuring the quantity of electricity delivered.

In both cases, the temperature of the battery is measured at the end of charging, and is stored in the memory 12 so as to constitute the reference temperature which is associated with the reference value of the capacity. The reference capacity and the reference temperature can be remeasured periodically by the user of the battery in order to take account of the ageing of the battery.

For a given technology, the relationship giving the relative variation of capacity as a function of temperature is known with good degree of accuracy, without it being necessary to re-measure it for each battery. The values of the relative variation, in the vicinity of a plurality of temperature values, are stored in the program memory 11.

The estimating step 23 therefore consists in algebraically adding an offset to the reference capacity, the offset being equal to the product of: the value of the relative variation in the vicinity of the reference temperature, for a one-degree variation in temperature multiplied by the reference capacity and by the temperature difference between the temperature Tb of the battery and the reference temperature.

The main loop 20 then consists in determining which is the mode in progress. A test 24 tests a byte of the backup memory 12 indicating which was the last mode to be selected by the converter 2 on receiving an instruction from the apparatus for optimizing charging. If the mode in progress is not maintenance mode, it is either charging mode or discharging mode, and the main loop consists in updating 25 the electricity balance.

The electricity balance 25 is calculated taking into account both the quantity of electricity stored in the battery during charging mode, and the quantity of electricity supplied by the battery to the external user circuit during discharging; but without taking into account either the quantity of electricity received by the battery or the quantity of electricity lost due to self-discharging during maintenance mode.

The sign of the current Ib measured at the battery terminal enables charging mode to be distinguished from discharging mode. If discharging, the quantity to be added to the electricity balance is negative and equal to the product of the current Ib multiplied by the time lapse since the preceding update of the balance. A clock inside the processor unit 10 enables the time lapse between two successive updates to be measured. If charging, the quantity to be added to the electricity balance is positive. A weighting coefficient equal to about 80% takes account of the efficiency of the battery in transforming the received electrical energy into stored electrochemical energy.

The main loop 20 then consists of a test 26, on the above-mentioned byte, to determine if the mode in progress is charging mode. If it is not charging mode, then it is discharging mode and the main loop consists in reinitializing the limit temperature parameter which may have been modified by processing while passing through one of the two subsidiary loops 30 or 40. This reinitializing 27 consists in giving the limit temperature parameter the value of the maximum allowable temperature, instead of a lower value which may have been allocated during a preceding charging period, and which is of no further interest once the battery is no longer alternately in maintenance mode and in charging mode. The main loop is terminated by a time delay 28 whose function is to prolong, e.g. by a second, the duration of a pass through the main loop 20. The program then starts acquiring 22 Ib, Ta, and Tb again.

The first subsidiary loop 30 is a branch processed only in the event that the mode in progress is maintenance mode. The first subsidiary loop consists of three successive tests 31, 32, 33. If the responses to all three tests are positive, the processing consists in sending an instruction at 34 so that the converter 2 switches from maintenance mode to charging mode. If any one of the responses to the three tests is not positive, maintenance mode is preserved. In both cases, processing returns to the main loop 20 at the time delay 28.

The first test 31 consists in comparing the electricity balance with the charging capacity which has been estimated as a function of Tb. If the balance is considerably less than the capacity, the response is positive. The second test 32 consists in calculating the temperature difference Tb−Ta of the battery above ambient, and in comparing said difference with a fixed value referred to as the "difference permitted at the start of charging". If the difference calculated is less than the difference permitted at the start of charging, the response is positive. The object of the second test 32 is to stabilize maintenance mode by creating hysteresis which prevents excessively frequent changes from maintenance mode to charging mode, taking place with excessively short maintenance periods.

The third test 33 consists in comparing the temperature Tb of the battery with the present value of the limit temperature parameter. If the temperature Tb is considerably less than the present value of the limit temperature parameter, the response is positive. When the optimizing apparatus has just been switched on, or when a discharging period has preceded the maintenance mode now in progress, then the value of the limit temperature parameter is equal to the predetermined value referred to as the maximum allowable temperature. On reading the description of the second subsidiary loop 40, it will become apparent that the limit temperature parameter may take another value which is less than the maximum allowable temperature, and which is the battery temperature as measured at the end of the previous charging period.

The second subsidiary loop 40 is performed in the event that the main loop 20 ascertains that the mode in progress is charging mode. The second subsidiary loop consists in updating 41 a parameter Tbfc referred to as the "temperature of the battery at the end of charging", the temperature of the battery generally increasing at the end of a charging period. In order to improve the accuracy in determining this parameter, the value selected is equal to the mean of a plurality of successive values of the temperature Tb, which successive values correspond to a short interval of time compared with the duration of charging.

The value selected is in fact equal to the temperature at the end of charging if one of the following tests decides to stop charging mode. The object of this modification in the value of the limit temperature parameter is to enable the test 33 in the first subsidiary loop 30 to prevent a change-over from maintenance mode to charging mode if the temperature of the battery has not decreased sufficiently for the charging capacity to be substantially increased.

When there has been no charging period since the optimizing apparatus was switched on, the change-over to charging mode may take place if the temperature of the battery is merely less than the maximum allowable temperature. In contrast, if there has been at least one charging period since initialization, a change-over from maintenance mode to charging mode is allowed by the test 33 in the first subsidiary loop 30 only if the temperature Tb is considerably less than the end-of-charging temperature at the end of the last charging period, which end-of-charging temperature is very generally less than the maximum allowable temperature. Thus, if ambient temperature varies significantly, optimum charging of a battery may be obtained by a succession of charging periods, separated by maintenance periods.

The second subsidiary loop 40 then consists of two tests 42 and 43 such that if one of the two responses is positive, processing consists in sending an instruction 44 to cause the converter 2 to switch from charging mode to maintenance mode, and, at 45, to store the updated value Tbfc as the value of the limit temperature parameter. The first test 42 consists in comparing the electricity balance with the charging capacity estimated as a function of the battery temperature Tb. If the balance is greater than the capacity, then the response is positive, and the apparatus goes into maintenance mode.

The second test 43 consists in calculating the temperature difference Tb-Ta of the battery above ambient temperature, and then in comparing the difference with a fixed value referred to as the "difference permitted at the end of charging". If the difference in the temperature of the battery above ambient temperature is greater than the fixed value, then the response to the test is positive, and the apparatus goes into maintenance mode.

The second test 43 is redundant because by estimating the real charging capacity and comparing it with the balance, charging can be stopped before any overcharging phenomenon occurs, thereby in particular avoiding severe overheating. The test 43 is provided for safety purposes, should a fault in the apparatus or any external event cause an abnormal rise in temperature in the battery, requiring charging mode to be stopped regardless of the values of the other parameters.

In any event, the second subsidiary loop 40 is terminated by a return to the main loop at the time delay 28.

It should be noted that using the apparatus for optimizing charging ensures that the battery is never subjected to overcharging, other than very exceptionally when the user measures the reference capacity, e.g. once per year.

In a variant embodiment, measuring the reference capacity is automated so as to avoid user intervention. In this case, the processor unit 10 measures the reference capacity periodically by sending an instruction to discharge the battery into the external circuit until the voltage of the battery reaches a value characteristic of complete discharge. Then the processor unit sends an instruction to charge the battery continuously until a temperature difference is detected between the battery temperature and the ambient temperature, which temperature difference is equal to the difference permitted at the end of charging, so as to conclude that charging is probably complete. The processor unit then compares the quantity of electricity stored and the quantity of electricity supplied by the battery. Lastly, the processor unit stores the temperature of the battery at the end of charging, so as to constitute the reference temperature corresponding to the reference capacity.

The scope of the invention is not limited to the above-described embodiment. For example, a person skilled in the art can control the converter 2 so that it supplies a current slaved to a reference value supplied by the processor unit, instead of supplying only two current values that are regulated and predetermined, corresponding to maintenance mode and to charging mode. Such continuous slaving is well known to a person skilled in the art. The method of the invention is particularly advantageous for batteries having a charging capacity that is very dependent on temperature, but the invention is applicable to any type of battery.

It should also be noted that the method is very particularly adapted to charging systems based on current-controlled battery charging, because the method avoids the need for compensating the maintenance voltage and the charging voltage as a function of temperature, which compensation is inherent to voltage-controlled charging

I claim:

1. A method of optimizing the charging of a battery of storage cells, the method including the steps of charging said battery at a first rate in a charging mode for compensating for discharging of said battery to an external circuit, and charging said battery at a lower second rate in a maintenance mode for compensating for self-discharging of the battery, said battery being characterized by a charge balance corresponding to a difference between an amount of charge supplied to said battery and an amount of discharge from said battery to said external circuit, said method further comprising the steps of:

calculating a threshold value corresponding to a charge that the battery can store without manifesting overcharging phenomena, the calculated value being referred to as the "charging capacity" of the battery and being calculated as a function of:
- a "reference" capacity which is the charging capacity of said battery at a reference temperature;
- a difference between a temperature (Tb) of the battery at the moment in question and the reference temperature; and
- a predetermined relationship for variation in charging capacity as a function of temperature (Tb) for the battery;

comparing said charge balance with said threshold value; and
switching between said maintenance mode and said charging mode as a function of the result of said comparison.

2. A method according to claim 1, characterized in that it further comprises periodically:
re-determining the charge balance and a new temperature of the battery;
obtaining a value for a new charging capacity that corresponds to the new temperature;
comparing the charge balance with the new charging capacity; an
deciding again either to switch from maintenance mode to charging mode, or to switch from charging mode to maintenance mode as a function of the result of the previous comparison.

3. A method according to claim 1, characterized in that, in order to determine the reference capacity of the battery at a reference temperature, the method comprises:
charging the battery until overcharging occurs, which overcharging is detected by comparing a threshold value with the difference between the temperature (Tb) of the battery and the ambient temperature (Ta);
taking the value of the reference capacity to be the charge balance; and
taking the reference temperature to be the temperature of the battery at the end of charging.

4. A method according to claim 2, characterized in that said switching step comprises switching from maintenance mode to charging mode only if:
the difference between the temperature (Tb) of the battery and ambient temperature (Ta) is less than a threshold value defining a permitted positive temperature difference for the battery at the start of charging; and
the temperature of the battery is less than a threshold value limiting the temperature that the battery is permitted at the start of charging; and
the charge balance is less than the charging capacity.

5. A method according to claim 4, characterized in that it further comprises:
determining and storing the temperature (Tbfc) of the battery at the end of each charging period; and
taking as the threshold value defining the limit temperature that the battery is permitted at the start of charging:

the temperature (Tbfc) stored at the end of the charging period preceding the period in question, if the period in question is not the first charging period after a period of discharging to an external circuit; and
a predetermined value, if the period in question is the first charging period after a period of discharging to an external circuit.

6. A method according to claim 2, characterized in that said switching step comprises switching from charging mode to maintenance mode:
if the temperature difference (Ta−Tb) of the battery above ambient temperature is greater than a threshold value defining the maximum positive temperature difference that the battery is permitted at the end of charging; or
if the charge balance is greater than the charging capacity.

7. Apparatus for optimizing the charging of a battery of storage cells by charging said battery at a first rate in charging mode for compensating for discharging of said battery to an external circuit, and charging said battery at a lower second rate in a maintenance mode for compensating for self-discharging of the battery, said battery being characterized by a charge balance corresponding to a difference between an amount of charge supplied to said battery and an amount of discharge from said battery to said external circuit, said charging being optimized by calculating a threshold value corresponding to a charge that the battery can store without manifesting overcharging phenomena, the calculated value being referred to as the "charging capacity" of the battery and being calculated as a function of (1) a "reference" capacity which is the charging capacity of said battery at a reference temperature, (2) a difference between a temperature (Tb) of the battery at the moment in question and the reference temperature, and (3) a predetermined relationship for variation in charging capacity as a function of temperature (Tb) for the battery, comparing said charge balance with said threshold value, and switching between said maintenance mode and said charging mode as a function of the result of said comparison, said apparatus comprising:

first means responsive to a charge signal and a maintain signal, respectively, for supplying the battery either with a charging current for said charging mode or with a maintenance current for said maintenance mode;

second means for determining said charge balance and for multiplying said charge balance by a predetermined weighting coefficient; and third means for generating a threshold value comprising an estimate of the charge that the battery can store without manifesting any overcharging phenomena, the value being referred to as the "charging capacity" of the battery, and being estimated as a function of:
- a "reference" capacity which is the charging capacity at a reference temperature;
- the difference between the temperature (Tb) of the battery at the moment in question and the reference temperature; and
- a predetermined relationship for the variation in charging capacity as a function of temperature (Tb) for the battery;

fourth means for comparing the charge balance with said threshold value and for supplying either a charge signal or a maintain signal as a function of the result of the comparison.

8. Apparatus according to claim 7, characterized in that the third means comprises:
fifth means for periodically re-determining the charge balance and a new temperature (Tb) of the battery; and
sixth means for obtaining a new value of capacity that corresponds to each new temperature;
and in that the second and fourth means the electricity balance and for supplying either a charge signal include seventh means for: re-establishing the charge balance periodically, comparing each new charge balance with a new value of capacity, and supplying a new charge signal or a new maintain signal as a function of the result of the comparison.

9. Apparatus according to claim 7, characterized in that the fourth means comprises:
fifth means for determining the ambient temperature (Ta);
sixth means for determining the temperature of the battery;
seventh means for determining the temperature difference (Tb−Ta) of the battery above ambient temperature, and for comparing the difference with the temperature (Tb) of the battery at a threshold value defining the maximum temperature that the battery is permitted at the start of charging; and
eighth means for supplying a charge signal if:
the electricity balance is less than the charging capacity; and
the temperature difference (Tb−Ta) of the battery is less than the maximum permitted positive difference; and
the temperature of the battery (Tb) is less than the maximum permitted temperature.

10. Apparatus according to claim 9, characterized in that the fourth means further comprises:
ninth means for determining and storing the temperature (Tbfc) of the battery at the end of each charging period; and
tenth means for determining a threshold value defining the limit temperature that the battery is permitted at the start of charging, the threshold value being equal to:
the temperature (Tbfc) determined at the end of the charging period preceding the charging period in progress, if the charging period in progress is not the first charging period after a period of discharging to an external circuit; or
a predetermined value, if the charging period in progress is the first charging period after a period of discharging to an external circuit.

11. Apparatus according to claim 7, characterized in that the fourth means comprises:
fifth means for determining the temperature (Tb) of the battery;
sixth means for determining the ambient temperature (Ta);
seventh means for determining the temperature difference (Tb−Ta) of the battery above ambient temperature, and for comparing the difference with a threshold value defining the maximum positive temperature difference that the battery is permitted at the end of charging; and
eighth means for supplying a maintain signal if:
the electricity balance is greater than the charging capacity; or
the temperature of the battery is greater than the maximum permitted temperature.

* * * * *